Figure 1:
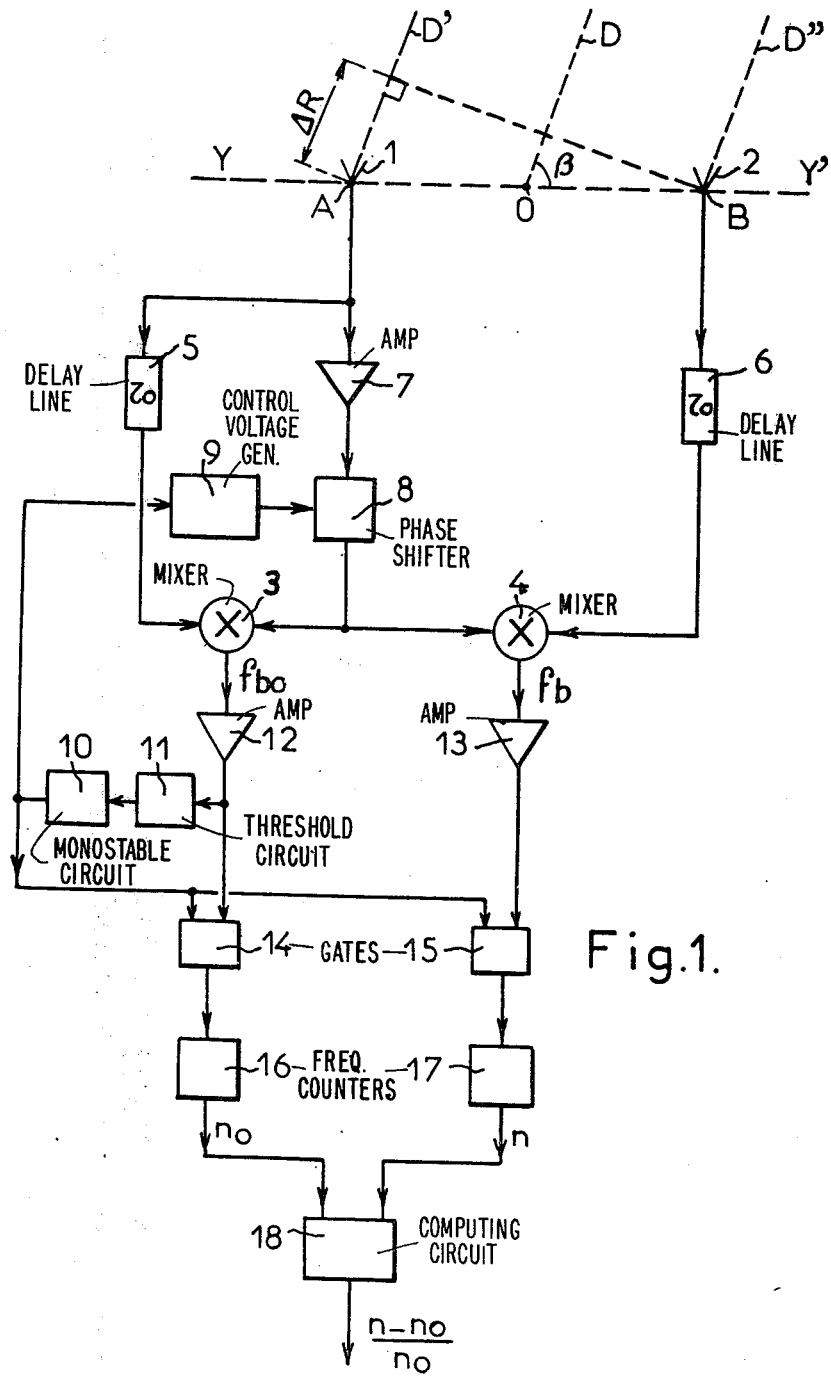

United States Patent [19]

Strauch

[11] 4,156,240
[45] May 22, 1979

[54] SYSTEM FOR PROVIDING ANGULAR DEVIATION DATA FOR LOCATING A TRANSMITTER

[75] Inventor: Raymond Strauch, Viroflay, France

[73] Assignee: U.S. Philips Corporation, New York, N.Y.

[21] Appl. No.: 794,396

[22] Filed: May 6, 1977

[30] Foreign Application Priority Data

May 7, 1976 [FR] France .................................. 76 13759

[51] Int. Cl.² ............................ G01S 3/48; G01S 9/02
[52] U.S. Cl. ................................. 343/6 DF; 343/113 R
[58] Field of Search .................. 343/5 GC, 5 LS, 104, 343/113 R, 113 DE, 6 DF

[56] References Cited

U.S. PATENT DOCUMENTS

| | | | |
|---|---|---|---|
| 2,996,711 | 8/1961 | Heiser | 343/104 X |
| 3,392,390 | 7/1968 | Schelisch | 343/104 X |
| 3,815,135 | 6/1974 | Martin et al. | 343/113 R |

Primary Examiner—Maynard R. Wilbur
Assistant Examiner—Richard E. Berger
Attorney, Agent, or Firm—Algy Tamoshunas

[57] ABSTRACT

Disclosed is a system for locating a transmitter arranged for transmitting frequency-modulated signals. The system supplies data about the angular deviation between the direction of the transmitter considered from a reference point and a reference axis passing through that point and comprises two antennas disposed on the reference axis symmetrically relative to the reference point, and a receiver having two mixers which receive, on the one hand, the respective signals from the two antennas through time delay elements and, on the other hand, the signal from one of the antennas through a circuit which provides, during a given period of time, a linear phase shift. The beat frequencies at the mixer outputs are measured by frequency meters during said time period and the desired information is given by the relative deviation between the output signals of the two frequency meters.

9 Claims, 7 Drawing Figures

SYSTEM FOR PROVIDING ANGULAR DEVIATION DATA FOR LOCATING A TRANSMITTER

The invention relates to a system for locating a transmitter arranged for the transmission of frequency-modulated signals, wherein said system must provide data regarding the angular deviation between the direction of the transmitter seen from a reference point and a reference axis passing through said point.

If the transmitter is mounted on an aircraft it is possible to define, by means of such a system, the location of the aircraft in a system of co-ordinates which, for example, is fixed with respect to the ground. Such a locating system can contribute to solving an actual problem which consists in supplying to a pilot which is preparing to land an aircraft which is near the beginning of the runway, information regarding the distance of the aircraft to a vertical plane passing through the axis of the runway. This information is intended to confirm data supplied to aircraft instruments by an Instrument Landing System—or ILS.

The data concerning the difference between the direction of a transmitter and a reference axis is obtained by means of systems which are known as interferometers. In these systems, the transmitter supplies a fixed frequency while the reference axis (which, in this example, is ground-based and transverse of the runway) is provided with receiving antennas located at different distances from one another. The working principle of these systems is the measurement of the phase differences between the signals received by the receiving antennas wherein the required number of antennas is determined by the desired measuring precision and is used for compensating measuring inaccuracies which are the result of the phase measurements which are only unambiguous over $2\pi$. Such a system for locating a transmitter arranged for transmitting frequency-modulated signals is disclosed in German Patent Application No. A 9215 of Guanella. This system, however, requires a large number of receiving circuits and is comparatively elaborate. Owing to the fact that the working principle of interferometers is based on phase measurements, interferometers are comparatively sensitive to the influence of noise signals which are produced in the plane of the incident wave. In addition, a landing system as mentioned above (ILS) requires its own transmitting source on board the aircrafts and a special antenna which radiates towards the ground.

It is an object of the invention to provide a simpler locating system which avoids these drawbacks.

The invention is characterized in that the receiver of the system comprises two antennas which are provided symmetrically on the reference axis relative to the reference point. The system comprises two mixer circuits with the signal from one of the antennas being supplied directly and through a delay element having a fixed delay time $\tau_o$ to one of the mixer circuits. The signal from said one antenna as well as the signal from the other aerial with a mutual delay equal to the fixed delay $\tau_o$ is supplied to the other mixer circuit. The system further includes two frequency meters coupled to the outputs of the mixer circuits for measuring the two beat frequencies supplied by the two mixer circuits and a circuit, coupled to the two frequency measuring devices, which computes the relative deviation from the output signals of the two frequency meters and provides the desired information at its output.

The invention can be used in a system which must supply to an aircraft data about the distance of the aircraft to a vertical plane passing through the axis of a runway. The system is formed by a transmitter with frequency modulation on board of the aircraft and a ground-based installation which comprises the above described receiver and a transmitting device which transmits, to the aircraft data derived from the data supplied by the receiver.

A particularly advantageous embodiment of such a system uses, for the radiation source the transmitting antenna of the radio altimeter on board the aircraft which is also used for measuring the height of the aircraft. In this arrangement the ground-based installation includes a modulator which modulates the data to be transmitted to the aircraft on a carrier which is formed by a signal received by one of the ground based antennas.

The transmitting antenna of the altimeter can also be used for receiving the signals transmitted by the ground-based installation whilst, from a non-directional coupling device which is applied on the power supply cable of said aerial a receiving device on board of the airship displays the data transmitted by the emitter of the ground-based installation.

Figure 2:
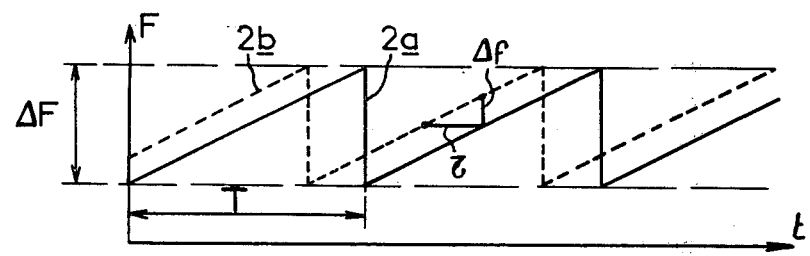
Figure 3:
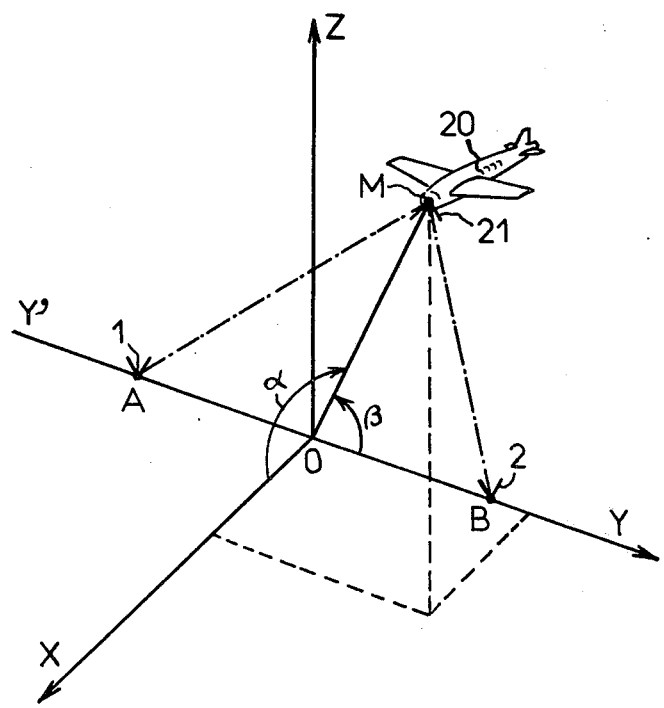
Figure 4:
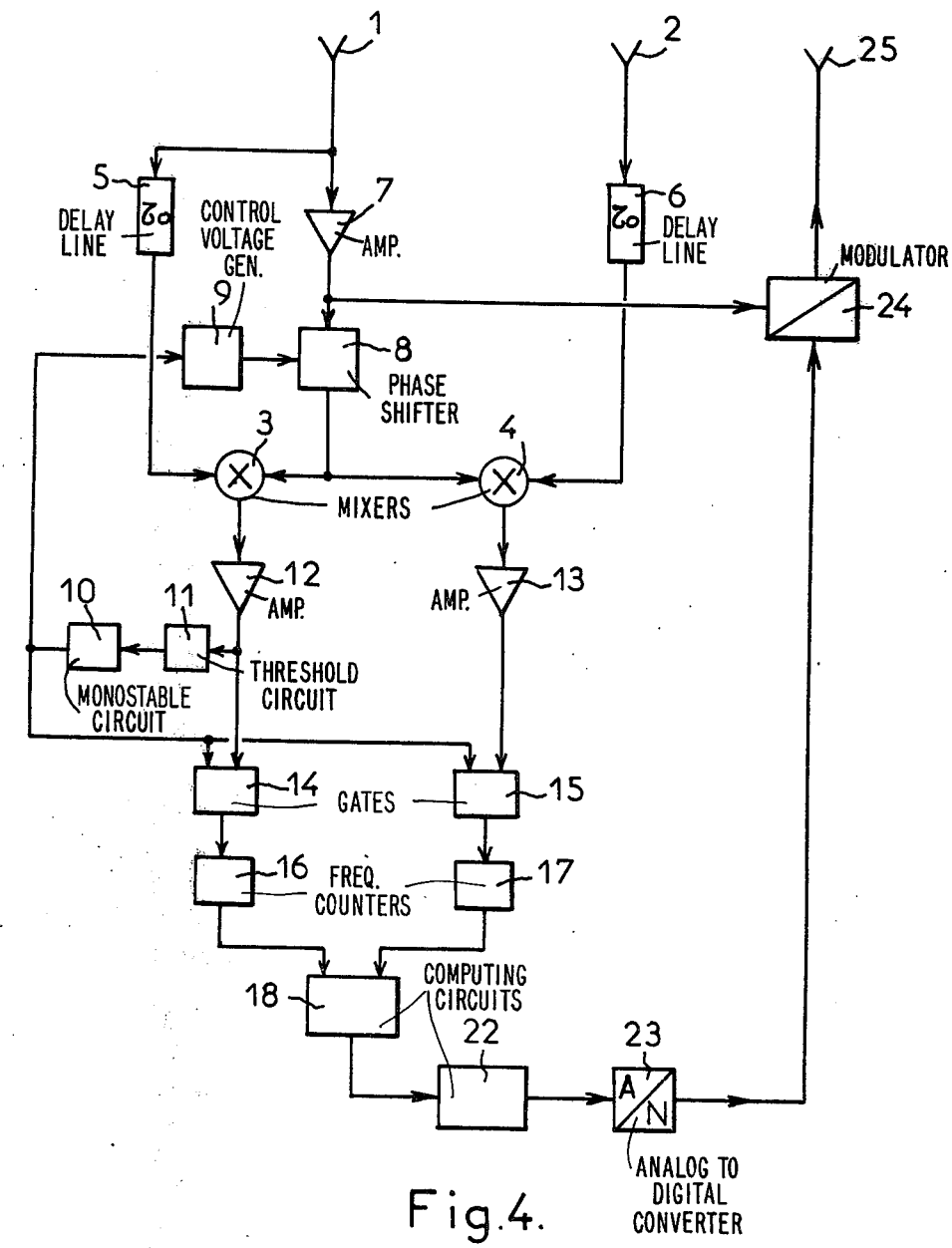
Figure 5A:
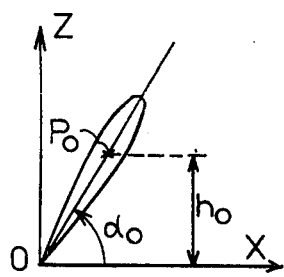
Figure 5B:
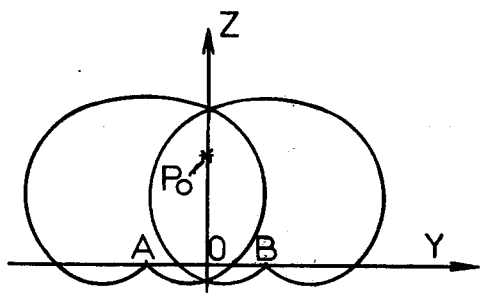
Figure 6:
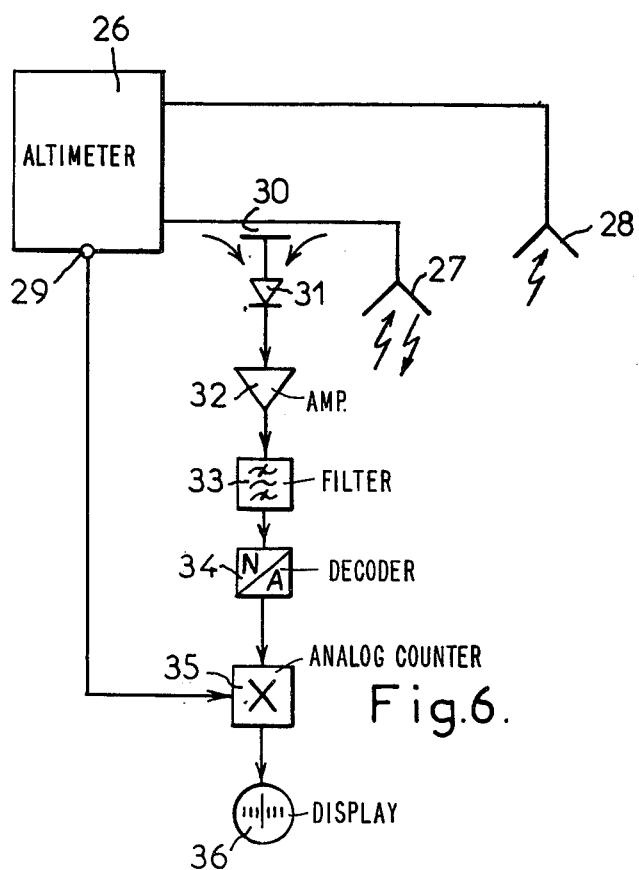

The invention will be further described with reference to a drawing wherein:

FIG. 1 shows the diagram of an embodiment of a receiver of the system according to the invention, FIG. 2 is a diagram which shows the frequency variations of the signals received if the transmitting frequency is linearly modulated, FIG. 3 shows a diagram of the geometrical configuration of the system according to the ILS-landing system, FIG. 4 shows the circuit diagram of the ground-based installation of the system which is used in said landing system, FIGS. 5a and 5b show, in two different planes, the form of the radiation patterns of the receiving antennas of the ground-based installation of said system used in the ILS-landing system, FIG. 6 shows the circuit diagram of the equipment used on board of the aircraft in the above system.

FIG. 1 shows an embodiment of a receiver of the locating system according to the invention. This system supplies data about the angular deviation $\beta$ between the direction D of a transmitter, not shown, considered from a point of origin O and a reference axis Y Y' which passes through the point O.

The transmitter transmits a frequency-modulated signal, for example a linearly-modulated signal, while the receiver comprises two antennas 1 and 2 which are disposed on the axis Y Y' at the points A and B which are symmetrical relative to the reference point O. The distance $2a$ between the two antennas which is chosen in dependency on the frequency deviation $\Delta f$ of the transmitter is comparatively large relative to the wavelength $\lambda$ of the transmitted signal. The distance $2a$ amounts to, for example, $150\lambda$ if $\Delta f = 100$ MHz, that is, 12 m for the case of $\lambda$ equal to 8 cm. Antennas 1 and 2 are each connected to an input of a mixer circuits 3 and 4, respectively, through elements 5 and 6, respectively, which introduce equal delay times $\tau_o$. The time delay elements 5 and 6 may be formed by cables which are adjusted to the proper length and which connect the antennas to the housing of the electronic apparatus. The other inputs of the mixer circuits 3 and 4 receive the signal from antenna 1, which has been amplified by the amplifier 7, through the circuit 8 which produces, in the signal, a linear phase shift during a time period Δt. Circuit 8 is, for example, a modulator is controlled by a voltage which supplied by the circuit 9 during time period Δt which is determined by the monostable circuit 10. Circuit 10 is switched-off if the level of the beat signal at the output of the mixer circuit 3 exceeds a threshold determined by the circuit 11. The two beat signals which are supplied by the mixer circuits 3 and 4 and which have the frequency $f_{bo}$ and $f_b$ respectively, are supplied to the gate circuits 14 and 15 through the amplifiers 12 and 13. The gates are controlled by the output signal of circuit 10 to ensure that they are open during the period Δt. The frequency counting meters 16,17 thus receive, during the time Δt, the beat signals of the frequencies $f_{bo}$ and $f_b$, and these frequencies are measured in that place by the number of signal changes $n_o$ and n respectively during the period Δt. The numbers $n_o$ and n are supplied to the circuit 18 which computes the relative deviation $(n-n_o)/n_o$.

Hereinafter it will be shown that the deviation $(n-n_o)/n_o$ can be used to characterize the angular deviation β between the direction of the transmitter OD and the reference axis Y Y'. To simplify matters it is assumed that the distance from the transmitter to the point of origin O is large relative to the distance 2a between the two antennas 1, 2. This means that the antennas 1 and 2 receive radiation from the transmitter along the directions D', D" which are parallel to the direction D. In accordance with FIG. 1 it is derived therefrom that the difference ΔR of the distances from antennas 1 and 2 to the transmitter is such that:

$$\Delta R = 2a \cos \beta \quad (1)$$

It will be shown that the deviation $(n-n_o)/n_o$ supplied by the circuit 8 is proportional to ΔR. The solid line 2a in FIG. 2 represents the sawtooth frequency variations of the linearly frequency-modulated signal which is received by the antenna 1. This signal is applied to the interconnected inputs of the mixer circuits 3 and 4; the function of the circuit 8 will be explained furtheron in the description. The dashed curve 2b represents the frequency variations of the signal applied to the other input of the mixer circuits 3 and 4. Curve 2b is derived from curve 2a through a time shift τ, and there is, at any given moment, a frequency difference Δf between the signals represented by curves 2a and 2b.

In the case of the mixer circuit 3, the time shift τ is the delay $\tau_o$ which is introduced by the delay element 5, while the frequency difference Δf is the beat frequency $f_{bo}$ supplied by the modulator.

As regards the mixer circuit 4, the time shift τ is the sum of delay $\tau_o$ introduced by the delay element 6 and the delay $\tau_\beta$ between the signals received by the antenna 1 and 2. The delay time $\tau_\beta$ is given by (ΔR/c), wherein c is the speed of propagation of the electromagnetic waves. The time shift $\tau = \tau_o + (\Delta R/c)$ corresponds to a frequency difference Δf which is the beat frequency $f_b$ supplied by the mixer circuit 4.

If ΔF is called the frequency deviation and T the period of the linearly frequency-modulated signal, the following formulae can be easily derived from FIG. 2:

$$\frac{f_{bo}}{\tau_o} = \frac{\Delta F}{T} \quad (2)$$

$$\frac{f_b}{\tau_o + \frac{\Delta R}{c}} = \frac{\Delta F}{T}$$

By combining expressions (2) the following expression is obtained:

$$\frac{f_b - f_{bo}}{f_{bo}} = \frac{1}{c\tau_o} \Delta R \quad (3)$$

During a time period Δt, the two frequency counting meters 16 and 17 count the number of changes in the signals having the frequencies $f_{bo}$ and $f_b$ and the results, $n_o$ and n of this count are a measure of these frequencies. Therefore the above expression (3) may be replaced by the expression:

$$\frac{n - n_o}{n_o} = \frac{1}{c\tau_o} \Delta R \quad (4)$$

When the expression (1) and (4) are considered more closely it can be ascertained that the relative deviation $(n-n_o)/n_o$ supplied by the circuit 18 is proportional to $\cos \beta$ and consequently may be used to define the angular deviation β. It should be noted that instead of using two delay elements 5 and 6 one delay element will suffice. Such a delay element must then be included in that portion of the circuit between the aerial 1 and the mixer circuits 3 and 4 where the amplifier 9 and circuit 8 shown in FIG. 1 are disposed.

The function of circuit 8 is to improve the precision of the apparatus. The situation is that in the absence of circuit 8, the signals with frequencies $f_{bo}$ and $f_b$ supplied by the mixer circuits 3 and 4 reproduce themselves in exactly the same way during each period T of the frequency modulation and the precision of the apparatus would not be improved by measuring the frequencies $f_{bo}$ and $f_b$ by counting during a time duration Δt which exceeds T. On the other hand, when using circuit 8 which causes the phase of the signal from antenna 1, applied to the mixer circuits 3 and 4 to shift linearly (for example from 0 to 2π) during a period of time Δt which exceeds T and which is, for example, equal to N T (N exceeds 1) each of the two beat signals is shifted over (2π)/N at the beginning of the successive periods T, which improves the precision of the apparatus by a factor of N.

By using the system of the invention it is possible in a very advantageous manner to solve the problem of assisting in the landing of an aircraft by confirming the indication given by the ILS landing system. This problem will be explained with reference to FIG. 3 which shows a coordinate system having three orthoginal axes XYZ wherein; axis OX is the axis of the runway, the plane XOY is the plane of the runway and the plane ZOX is the vertical, symmetrical plane of the runway. The position of the aircraft 20 is given by the co-ordinates X, Y, Z of one of the points M of the aircraft, or in polar coordinates by the height $z = h$ and the angles $\alpha = \widehat{MOX}$ and $\beta = \widehat{MOY}$. An aircraft which is about to land should follow a certain path and remain in the symmetrical plane of the runway. For landing operations of category III (wherein the visibility is practically zero), before the aircraft arrives at the beginning of the runway at a height of some dozens of meters, it is necessary for the pilot to confirm the indication supplied by the ILS as regards the deviation of the aircraft relative to the symmetrical plane of the runway. With respect to FIG. 3 this means the problem of obtaining an identification onboard the aircraft relative to the distance y when the aircraft arrives near the plane ZOY.

This problem is solved in the following manner by means of the system according to the invention. The aircraft 20 is provided with a transmitter which supplies lively frequency modulated signal to the antenna 21 which transmits it to the ground. To this end it is possible to use the radio-altimeter with frequency modulation with which aircrafts are provided, the antenna 21 being formed by the transmitting antenna of the altimeter.

The ground-based portion of the system is shown in FIG. 4 and comprises the receiver described with reference to FIG. 1 whose elements have been given the same reference numerals. FIG. 3 shows the two receiving antennas 1 and 2 which are disposed on the reference axis Y'OY at points A and B which are symmetrical relative to the point of origin O. In accordance with a special embodiment, the radiation patterns of the antennas 1 and 2 are of the form shown in FIGS. 5a and 5b. FIG. 5a shows the projection of the radiation pattern in the plane ZOX. FIG. 5b shows the projection of the pattern in the plane ZOY. The radiation pattern of each antenna is formed by a conical plane which is at an angle $\alpha_o$ with respect to the plane of the runway, $\alpha_o$ being, for example, 75°. In a central zone the patterns of the two antennas partly coincide. The practical effect of the threshold circuit 11, which switches the monostable circuit 10 off during a period $\Delta t$, is to activate the receiver only when the signals received by the antennas 1 and 2 reach a certain threshold. In practice this means the determination in the radiation patterns of the two antennas 1 and 2 of a given area in which the receiver is active and which is centred around a point $P_o$ which is characterized by the height ho and by the polar angle $\alpha_o$ (see FIGS. 5a and 5b). As regards the problem of assisting in landing, of the aircraft $H_o$ is set at 30 m, and the value 75° is, for example, chosen for the angle $\alpha_o$. If an aircraft passes through this range in which the receiver is active, circuit 18 of the receiver computes the relative deviation $(n-n_o)/n_o$, defined above, which, in accordance with formula 4, is proportional to $\Delta R$ and which indicates the difference between the distances AM-BM of the receiving antennas 1 and 2, on the one hand, and the transmitting antenna 21 on the aircraft, on the other hand.

In the case considered the distance from the antenna 21 to the point of origin O is not very large relative to the distance between the two antennas 1 and 2. It can be shown that a good approximation of the distance y between the aircraft and the symmetrical plane of the runway is given by the expression:

$$y = \mu . h . (\Delta R / 2a) \quad (5)$$

In equation 5, the factor $\mu$ depends on $\Delta R$ and on various constants $h_o$, $\alpha_o$ which were accurately defined above.

In the ground-based installation the circuit 18 which supplies the magnitude $(n-n_o)/n_o$ which is proportional to $\Delta R$, is followed by the circuit 22 which on the basis of $\Delta R$ and various parameters $h_o$, $\alpha_o$, a, known on the ground, computes an approximated value $y_o$ of the computed distance. The value $y_o$ being given by the formula 5 wherein the average value $h_o$ is used for the height h, $h_o$ HO being the only height known on the ground.

This approximated value $y_o$ is again transmitted to the airship by means of an analog-to-digital convertor 23 whose output signal is supplied to the modulator 24 for modulating a carrier which is the signal received by the antenna 1 and amplified by the amplifier 7. The carrier, which is modulated in that manner by the signal $y_o$ is applied to the transmitting aerial 25, transmits it to the airship.

FIG. 6 shows diagrammatically the equipment installed on board the airship. The favourable situation will be considered here in which a radio-altimeter is used with frequency modulation on board the airship to determine the height thereof relative to ground. This altimeter 26 supplies its transmitting aerial 27 with a signal whose frequency is linearly modulated and processes the signal received on its aerial 28 in order to supply at the output 29 of the altimeter an analog signal which corresponds with the height h of the airship relative to ground. As stated above the radiation of the transmitting aerial 27 of the altimeter 26 is used in the system according to the invention and said radiation is received by the receiving aerials 1 and 2. The aerial 27 is also used for receiving the radiation transmitted by the transmitting aerial 25 of the ground-based equipment. In order to have the disposal in the airship of information $Y_o$ which modulates the carrier transmitted by the aerial 26 in the ground-based equipment a nondirectional aerial coupler 30 is used which is disposed in the cable of the aerial 27 and which comprises a mixer diode 31. So this diode receives a portion of the energy transmitted by the aerial 27 and also a portion of the energy received by this aerial and originating from the transmitting aerial 25 of the ground-based equipment. A beat signal which is modulated by the information $Y_o$ is received at the output of said mixer diode 31. After amplification and filtering of this signal in the amplifier 32 and filter 33 respectively the information $Y_o$ is obtained in digital form and this is digital information $Y_o$. This signal is received by the aircraft and converted into analog information by the decoder 34. To obtain the desired distance data y corresponding to the actual height of the airship relative to ground, the analog signal which corresponds to $y_o$ is supplied to the analog counter circuit 35 wherein said signal is multiplied by $h/h_o$, ho being a constant parameter h being the height signal which is supplied by the output 29 of the altimeter. The distance deviation signal y is supplied to a display device 36 which is at the disposal of the pilot. It is to be noted that when the height h of the aircraft is not at least one order larger than the distance 2a between the two antennas 1 and 2, the radiation from the transmitter to these antennas is no longer parallel to each other. The counter circuit 35 can be arranged to correct the counted value for the loss in accuracy caused by this effect.

From the above it follows that by using the invention a particularly simple system is obtained for assisting in the landing system ILS and that both as regards the groundbased equipment wherein only two receiving circuits are used and as regards the equipment on board wherein the antenna and the transmitting source of the radio altimeter with modulation frequency can be used advantageously. It can furthermore be derived from equation 4 that the information supplied by the receiver is independent of the parameters F and T which characterize the linear frequency modulation. Consequently, the receiver can be used in conjunction with an arbitrary radioaltimeter in which this type of modulation is used.

What is claimed is:

1. A system for providing data regarding the angle between the direction, with respect to a reference point, of a radio source transmitting frequency modulated signals, and a reference axis passing through said point, said system comprising a pair of antennas disposed on said reference axis and spaced symmetrically about said reference point, a receiver coupled to said antennas, said receiver including a pair of mixers each having a pair of inputs and an output, first means for coupling signals received by one of said antenna to one input of each mixer, second means for coupling said signals received by said one antenna to the other input of one of said mixers, third means for coupling signals received by the other antenna to the other input of the other mixer, means for delaying the signal supplied to one input of each mixer by a predetermined, substantially equal time period, frequency measuring means coupled to said output of each mixer for generating a signal representative of the frequency of signals at said outputs of said mixers, and means coupled to said frequency measuring means for computing said angular data from signals generated by said frequency measuring means.

2. The system according to claim 1 wherein said first coupling means includes means for linearly shifting the phase of the signal coupled to said one input of said mixers during a given time period.

3. The system according to claim 2 including means for activating said phase shifting means during said given time period.

4. The system according to claim 3 wherein said activating means includes a threshold circuit for comparing a signal representative of the signal received by one of said antennas with a predetermined value and a monostable circuit responsive to said threshold circuit for providing signals indicative of the start and end of said given time period.

5. The system according to claim 4 wherein said signal representative of said received signal is the signal at the output of one of said mixers.

6. The system according to claim 1 wherein said signal generated by said computing means is in digital form.

7. The system according to claim 1 wherein said signal transmitting source is in an aircraft and said antennas are disposed symmetrically with respect to a vertical plane passing through the axis of a runway, said antennas having substantially identical radiation patterns with the peak thereof being at a predetermined angle to the plane of the runway, said system further including means coupled to said computing means for deriving, from said angular data provided by said computing means and an average value of the height of said aircraft, data regarding the distance between the aircraft and said vertical plane and means for transmitting, to said aircraft, said data regarding said distance, said aircraft having means for measuring the altitude of said aircraft, means for receiving said data regarding said distance and means for deriving, from said data regarding said distance and altitude data provided by said altitude measuring means, the distance between said aircraft and said vertical plane.

8. The system according to claim 7 wherein said altitude measuring means is an altimeter having a transmitting antenna comprising said transmitting source and said transmitting means includes means for modulating a carrier formed by a signal received by one antenna of said pair of antennas.

9. The system according to claim 8 wherein said receiving means includes said transmitting antenna of said altimeter which is used for receiving signals from said transmitting means, a nondirectional coupler for coupling the signals received by said transmitting antenna to a mixer circuit and means, connected to said mixer circuit, for deriving, from the received signals, a signal corresponding to the signal transmitted by said transmitting means, and wherein said means for deriving said distance includes a multiplier circuit for forming a product of signals from said altimeter representative of the altitude of said aircraft and signals representative of said data regarding said distance, said product being representative of the distance between said aircraft and said vertical plane.

* * * * *